(No Model.) 2 Sheets—Sheet 2.
H. WINTER & W. C. WILLIAMSON.
STEERING MACHINERY.
No. 318,068. Patented May 19, 1885.
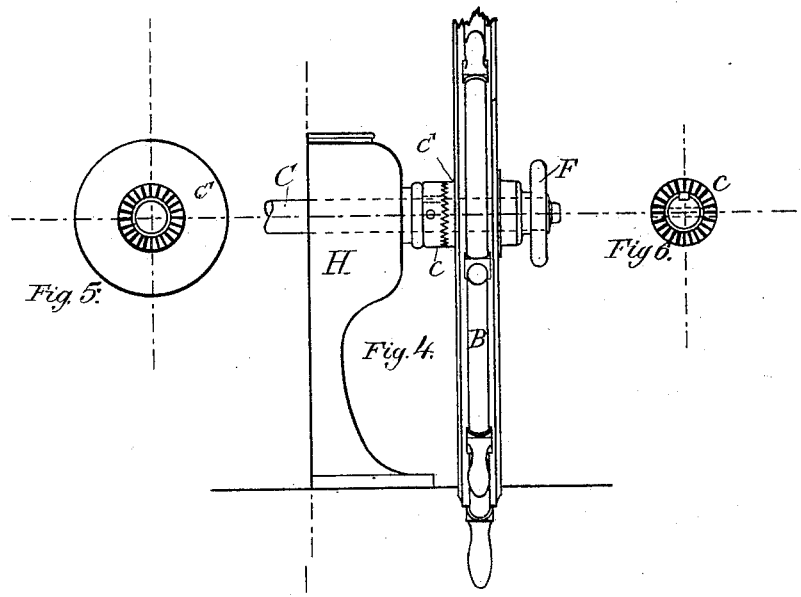
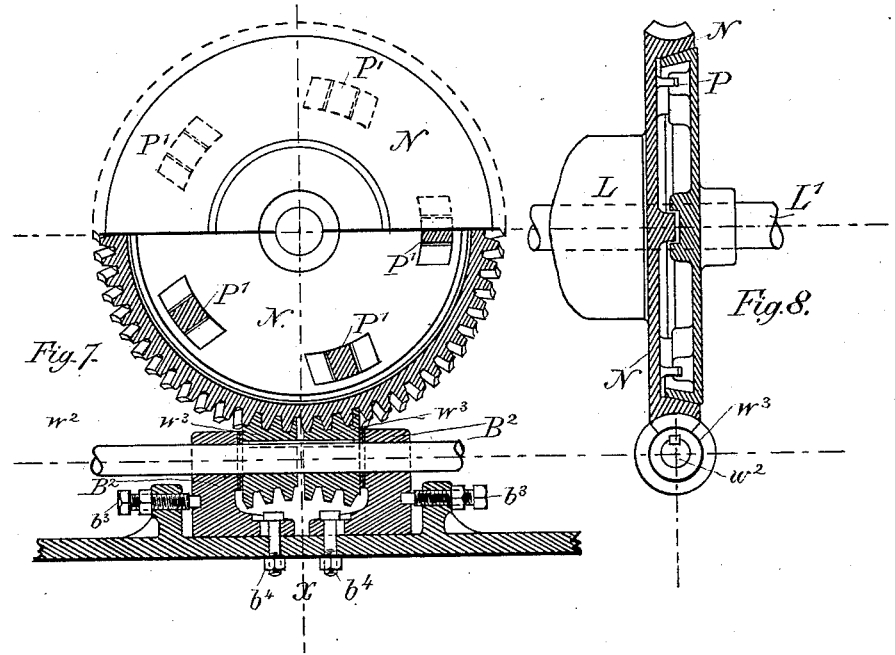
WITNESSES:
Leo Von Rosenberg
Francis P. Reilly
INVENTORS:
Herman Winter
Wm. C. Williamson
by R. R. Voorhees
ATTORNEY

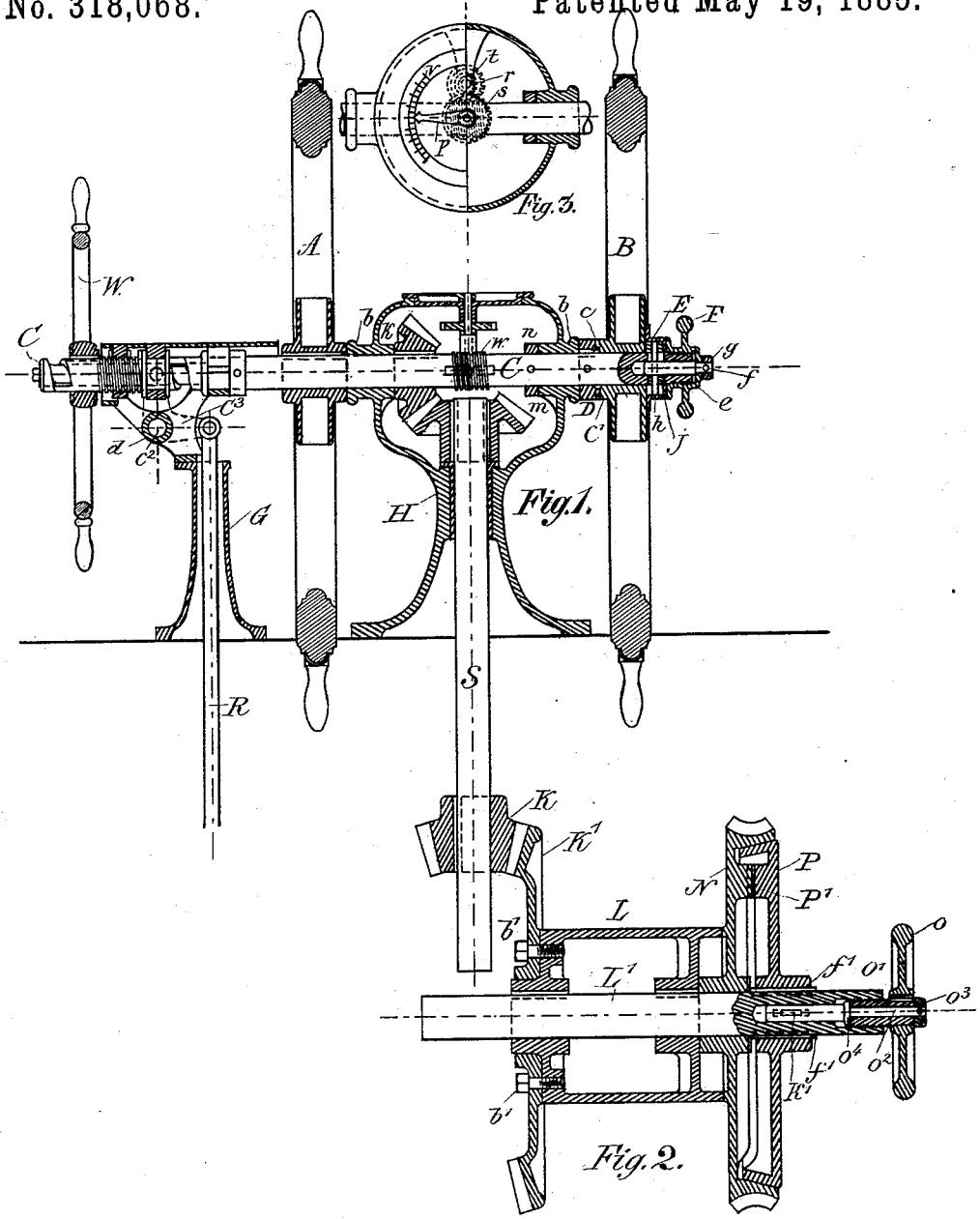

UNITED STATES PATENT OFFICE.

HERMAN WINTER, OF NEW YORK, N. Y., AND WILLIAM C. WILLIAMSON, OF PHILADELPHIA, PENNSYLVANIA, ASSIGNORS TO GEORGE W. WILLIAMSON, JOHN D. WILLIAMSON, AND WILLIAM C. WILLIAMSON, OF PHILADELPHIA, PENNSYLVANIA.

STEERING MACHINERY.

SPECIFICATION forming part of Letters Patent No. 318,068, dated May 19, 1885.

Application filed December 5, 1884. (No model.)

*To all whom it may concern:*

Be it known that we, HERMAN WINTER, of the city of New York, in the county and State of New York, and WILLIAM C. WILLIAMSON, of the city and county of Philadelphia, in the State of Pennsylvania, have jointly invented certain new and useful Improvements in Combined Hand and Steam Steering Machinery for Ships, which invention is fully set forth and illustrated in the following specification and accompanying drawings.

The object of this invention is to facilitate the connecting and disconnecting of certain parts of the apparatus necessary for changing from hand-power steering to steering by steam-power, and vice versa, the same hand-shaft being rotated for steering in either case. It is also its object to provide an efficient pointer or tell-tale to indicate the desired change of ship's course, the same being operated by the steering mechanism.

The invention consists of the parts and combinations of parts hereinafter described and specifically set forth in the claims.

In the accompanying drawings, Figure 1 is a longitudinal vertical section through the hand-operated wheels and shafting for steering both by hand-power alone and by steam-power alone. Fig. 2 is a longitudinal vertical section through the steering-drum or chain-wheel, showing means of connecting and disconnecting the same to and from the steam-operated power-wheel, and the connection of drum and hand-steering wheel or wheels. Fig. 3 shows in plan a pointer moving over an index-plate with gearing by which said pointer is operated by the revolution of the steering mechanism. Fig. 4 is a half-elevation of the column supporting the steering-wheel shaft, showing a method of attaching a hand-wheel to said shaft. Figs. 5 and 6 are details of the means of attaching said wheel and shaft, hereinafter described. Figs. 7 and 8 are respectively an end view, partly in section, and a vertical longitudinal section of the worm-gearing, which is operated by the steam-steering engines. (Not shown.)

In said figures the several parts are indicated respectively by letters, as follows:

A is a hand-power wheel keyed fast to its shaft; B, hand-power steering-wheel loosely mounted upon the same shaft C, but capable of end motion on said shaft; D, a collar or sleeve keyed fast to the shaft C, and having serrations or V-shaped teeth upon its end at $c$, opposite similar teeth $c'$ in the hub of the wheel B.

To the end of the hub of the wheel B is secured the cap E, turning freely with said wheel on the shaft C, which shaft is provided with screw-threads on its extreme end at $e$.

Upon the extreme end of the sliding bolt $f$ is keyed or pinned a collar, $g$. Said bolt $f$ slides in and out of the hole provided for it and bored out in the end of the shaft C, as shown in Fig. 1.

Within the cap E is a collar, $j$, on the shaft C, secured by a key, $h$, through a slot in the shaft C, to the bolt $f$. Said slot is longer than the width of said key, as shown in the drawings, to allow for the travel of said key when the bolt $f$ is caused to slide. Between the collar $g$ and the cap E is the small hand-wheel F, whose hub forms a threaded nut screwed upon the threads $e$ of the shaft C.

The operation of the steam-steering wheel W and its attached gearing quite obviously operates the rod R, which actuates the steering-engines in either direction, and is the same as that patented in Patent No. 300,180, June 10, 1884, and needs, therefore, no special description here.

The governing mechanism, consisting of the hand-power steering-wheels A and B, the steam-power steering-wheel W, and the shaft C, upon which said wheels are mounted, is supported upon the two hollow pillars or columns G H, in which rod R and vertical shaft S and its gearing are respectively inclosed. The shaft C is journaled in bearings on the hollow column H at $b\ b$. It will be observed, however, that a bearing, $d$, being provided on the hollow column G for the center $c^2$ of the bell-crank $c^3$, said column thereby serves as a support or "spring-bearing" for the shaft C. The hand-wheel A is keyed fast to the shaft C, and of course may or may not be used, as desired, depending upon the hand-power or number of men required to steer by hand-power alone, or said wheel may be entirely dispensed with.

It is obvious that the wheel B may take the place of the wheel A, if desired, forward of the column H, instead of abaft it, the shaft C being bored deeper for the travel of the bolt or rod $h$. The shaft C is provided with bevel-gear $k$, which gears into corresponding horizontal bevel-gear $m$ on the vertical shaft S, and a collar, $n$, is secured to the shaft C opposite the bevel-gear $k$. End motion is thus prevented by said gear and collar, each bearing endwise against the bearings $b\ b$. Between said gear and collar on the shaft C is the worm $w$, which gears into the worm-wheel $t$, Fig. 3, on a vertical shaft provided with the spur-gear $r$, which in turn gears into the gear-wheel $s$, which carries upon its axis the index-pointer $p$, which is thus caused to traverse over the graduated arc $v$, and thus indicates at all times not only the angle of the rudder with the keel, but, if pointing forward or ahead, as shown in the drawings, it also indicates not only the side to which the rudder has been put, but more clearly the side to which the ship's head must turn. It may thus also indicate the direction in which the wheel has been turned to effect such change of ship's course, the wheel being so geared and the multiple of the pointer's gearing being proportioned to accomplish said objects. Said index may of course be covered by a substantial and handsome glass plate.

When steering by hand-power alone, the vertical shaft S actuates the chain-drum L by the bevel-gearing K K'; but at such time, in order to permit the drum to turn, (as the worm-wheel N, though not fast upon the shaft L', is held fast from turning by the worm-shaft $w^2$, Fig. 8, moved by the engines,) the drum L is disconnected from the worm-wheel N by simply turning the small hand-wheel $o$, which thereby throws out the cone-friction wheel P and inside clutch, P', and thus disconnects said drum and cone-wheel, which are each fast upon the shaft L', the drum being keyed thereto and the cone-wheel sliding thereupon on the feathers $f'$. Of course the wheel N and clutch may be constructed for permanent contact, if desired, or the wheel N be keyed fast to the shaft L' and the clutch dispensed with. When steering by steam-power, said clutch-cone is of course always thrown in and kept in by screwing up the wheel $o$.

It is evident that the cone-friction may be used without the clutch P', or vice versa, or any ordinary clutch be substituted for either.

One advantage of the joint use of the cone-friction and the parts P' is that there being some play or lost motion between the male part of P' on the cone-wheel P and the female part of P' on the wheel N, if sudden strain is brought upon the rudder the cone-friction may yield until all lost motion is taken up in the clutch P', and thus prevent breakage of, as well as noise and jar in, the parts subjected to such strain. Said clutch-coupling is thus operated. The wheel $o$ is keyed fast to the sleeve $o'$, screwed into the drum-shaft L'. The sleeve $o'$ is mounted and turns loosely on the small shaft or bolt $o^2$, upon the end of which is pinned the collar $o^3$. Said bolt is also provided with a collar, $o^4$, to take the inner thrust of the sleeve $o'$. The hub of the cone-wheel P slides upon the shaft L', but is prevented from turning thereon by the feathers $f'$. Said hub is also secured to the sliding bolt $o^2$ by the key $k'$, driven through said hub and bolt between the feathers $f'$. It can now be readily seen that the revolution of the wheel $o$ will force the cone-wheel and clutch either into or out of contact with the power-wheel N by its forcing the bolt $o^2$ in either direction required for such purpose, the inner thrust of the sleeve $o'$ being imparted to the collar $o^4$, and said sleeve's outer thrust being imparted to the collar $o^3$. When said clutch is in contact and steam-power is being used by operating the hand-wheel W, Fig. 1, it may be desired to throw the hand-wheel B out of gear. In such case it can be readily seen, from the description hereinbefore given of the attachment of said wheel to the shaft C, that the simple turning of the small hand-wheel F will cause the wheel B to slide either into contact with the serrated collar D, or away therefrom, for the key $h$ takes the thrust of the wheel F upon the collar $g$, and acting upon the collar $j$ draws the wheel B away from the sleeve D, and the cap E takes the thrust of the wheel F to throw the wheel B into contact with the sleeve D.

It will be observed that the drum L is bolted to the gear K' by bolts $b'$. By this arrangement said gear can be turned on its axis and new teeth brought in contact with its pinion K, if desired, to change the wear upon said teeth. The wear upon said teeth is unequal in practice, due to the fact that small changes in the angle of the rudder are more frequent than those from "hard-over" on one side to the other extreme. The worm $w^3$ upon the driving-worm shaft or crank-shaft $w^2$ is divided transversely through its center at the line $x$, forming two worms, each worm capable of sliding upon feathers on the shaft $w^2$. All lateral thrust is thus put upon the end bearings, $B^2$. Said worms have an interval between them, as seen at the line $x$, and, by the adjustment of the bearings $B^2$, are set up as may be required to compensate for wear due to use. The bearings $B^2$ are adjusted by means of the bolts $b^3\ b^4$, as clearly shown in Fig. 7.

Having thus fully described our said improvements as of our invention, we claim—

1. In a steering-machine, a hollow column or pedestal, as H, provided with shaft-bearings, as $b\ b$, and carrying in said bearings a rotary hand-power shaft, as C, in combination with bevel-gearing and shafting inclosed within said column, and connected to the drum-shaft or chain-wheel and rudder, as described, whereby the rudder is operated by hand-power alone by rotating said shaft, substantially as and for the purposes set forth.

2. In a combined hand and steam power steering-machine, in combination with a hollow column or pedestal, as H, carrying in suitable bearings a steering-wheel shaft, as C, and inclosing bevel-gear and shafting for transmitting motion from said shaft to a chain-wheel or drum for actuating the rudder, a second hollow column or pedestal, as G, supporting said shaft and a steering-wheel, as W, and inclosing a rod operated by said wheel, and connected to steering-engines for actuating said engines in either direction by the movements of said wheel, substantially as and for the purposes set forth.

3. In a steering-machine, a hollow column or pedestal, as H, provided with shaft-bearings, as b b, and carrying in said bearings a rotary hand-power shaft, as C, in combination with gearing and shafting inclosed within said column and connected to a tell-tale or pointer, as p, and to the drum-shaft or chain-wheel and rudder, as described, whereby the rudder is both operated by hand-power alone, and at the same time its angle with the ship's course, if any, or desired change of ship's course, indicated by rotating said first-named shaft, substantially as and for the purposes set forth.

4. In a steering-machine, a hand-wheel shaft, as C, provided with a serrated flange or collar, as D, in combination with a hand-wheel, as B, loosely mounted on said shaft, and having a correspondingly-serrated hub, whereby said shaft and said wheel are coupled together when said serrations are interlocked, but uncoupled when said serrations are withdrawn from each other, substantially as set forth.

5. In a steering-machine, a hand-wheel shaft, as C, provided with a serrated flange or collar and a screw-threaded end, as e, in combination with a hand-wheel, as B, loosely mounted on said shaft and having a serrated hub and a cap, as E, and operated by a key and bolt within said shaft, and a hand-wheel, as F, upon the threaded end of said shaft, whereby said wheel B is connected to said shaft or disconnected therefrom at will, substantially as and for the purposes set forth.

6. In a steering-machine, in combination with a steering-drum, as L, for driving the same and being driven thereby, a pinion, as K, and a gear-wheel, as K', detachably connected to said drum, whereby said gear-wheel may be disconnected from said drum and turned to change the teeth in gear with said pinion and resecured to said drum without altering the set of either said drum or said pinion upon their respective shafts, substantially as and for the purposes set forth.

7. In a steam steering-machine, in combination with a worm-wheel for actuating the chain-wheel or steering-drum, a driving-shaft provided with a worm sliding upon said shaft, and adjusted by movable end bearings, whereby provision is made for taking up the wear of said worm and end thrust upon said shaft prevented, substantially as and for the purposes set forth.

8. In a combined hand and steam steering-machine, the combination of a driving-drum or chain-wheel, as L, keyed fast to a shaft, as L', a power-driving gear-wheel, as N, loose on said shaft, and a sliding clutch-coupling consisting of a cone-friction wheel, as P, and an interior clutch, forming a male and female coupling, as P', with said power-driving gear-wheel, whereby both a frictional or rolling contact and a positive contact are secured between said wheels, substantially as and for the purposes set forth.

9. In a combined hand and steam steering-machine, the combination of a driving-drum or chain-wheel, as L, keyed fast to a shaft, as L', a power-driven gear-wheel loose on said shaft, and a clutch-coupling sliding upon said shaft, but rotating therewith, and keyed to a sliding bolt within the shaft L', said bolt being operated by a threaded sleeve or hub secured to a hand-wheel, as o, and screwed into the end of the shaft L', whereby said power-driven wheel is either connected to the shaft L' to rotate therewith or disconnected therefrom by screwing up or unscrewing the wheel o for hand-power steering or steam-power steering, as may be desired, substantially as set forth.

HERMAN WINTER.
WILLIAM C. WILLIAMSON.

Witnesses as to Herman Winter:
    FRANCIS P. REILLY,
    JOHN TULLY.
Witnesses as to Wm. C. Williamson:
    MATHIAS SEDDINGER,
    C. WESLEY RUFFELL.